(12) United States Patent
Ban

(10) Patent No.: US 8,009,594 B2
(45) Date of Patent: Aug. 30, 2011

(54) METHOD AND APPARATUS FOR AUTOMATIC POWER SAVING MODE INSERTION WHEN AN UNKNOWN OR AN OFFENSIVE RECEIVER DETECTED IN A WIRELESS ACCESS SYSTEM

(75) Inventor: Oliver K. Ban, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 12/060,918

(22) Filed: Apr. 2, 2008

(65) Prior Publication Data
US 2008/0186894 A1    Aug. 7, 2008

Related U.S. Application Data

(63) Continuation of application No. 11/375,458, filed on Mar. 14, 2006, now abandoned.

(51) Int. Cl.
| H04B 1/44 | (2006.01) |
| H04B 7/185 | (2006.01) |
| H04W 4/00 | (2009.01) |

(52) U.S. Cl. ............... 370/282; 370/317; 370/332
(58) Field of Classification Search .......... 370/282–292, 370/310–318, 332
See application file for complete search history.

(56) References Cited

U.S. PATENT DOCUMENTS

| 5,715,277 | A * | 2/1998 | Goodson et al. ............. 375/222 |
| 5,870,397 | A | 2/1999 | Chauffour et al. |
| 6,708,147 | B2 * | 3/2004 | Mekuria et al. ............... 704/228 |
| 7,321,581 | B2 * | 1/2008 | Wei et al. ........................ 370/342 |
| 7,436,786 | B2 * | 10/2008 | Ban .................................. 370/282 |
| 7,676,027 | B2 * | 3/2010 | Laurent et al. ............. 379/88.13 |
| 2002/0159551 | A1 | 10/2002 | Ekvetchavit et al. |
| 2004/0085917 | A1 * | 5/2004 | Fitton et al. .................... 370/292 |
| 2005/0122961 | A1 | 6/2005 | Ban |
| 2006/0222013 | A1 * | 10/2006 | Ban ................................. 370/474 |
| 2007/0217429 | A1 * | 9/2007 | Ban ........................... 370/395.31 |
| 2008/0291904 | A1 * | 11/2008 | Ban .................................. 370/352 |

FOREIGN PATENT DOCUMENTS

JP    2003-298644    10/2003

OTHER PUBLICATIONS

"Voice IP-Per Call Bandwidth Consumption", http://www.cisco.com/warp/public/788/pkt-voice-general/bwidth_consume.htm, May 28, 2005.

* cited by examiner

*Primary Examiner* — Tri H Phan
(74) *Attorney, Agent, or Firm* — Gibb I.P. Law Firm, LLC

(57) ABSTRACT

Embodiments of the invention provide a method, system, etc. for automatic power saving mode insertion when an unknown or an offensive receiver detected in a wireless access system. A method comprises generating a look-up-table from AGWN payloads in a plurality of AGWN packets. The look-up-table is then transmitted from a transmitter to a receiver. Next, the method generates a coded packet from an AGWN packet in a data packet using the look-up-table, wherein a code from the look-up-table is substituted in place of the AGWN packet. Specifically, the substituting of the code from the look-up-table comprises substituting coded symbols representing AGWN payloads in the AGWN packets. Further, the generating of the look-up-table comprises generating the code to represent size and strength information regarding an AGWN, wherein the coded packet is generated with a size that is less than the data packet.

20 Claims, 5 Drawing Sheets

| Symbol | AWGN payload |
|---|---|
| 0FFF01 | 142131 .................... RN(1,5) |
| 0FFF02 | 214312 .................... RN(1, 5) |
| . (24 bits) | * (1024 bits) |
| . | * |
| . | * |
| 0FFFFF | RN(1, 5, 1024) |

610, 620, 600

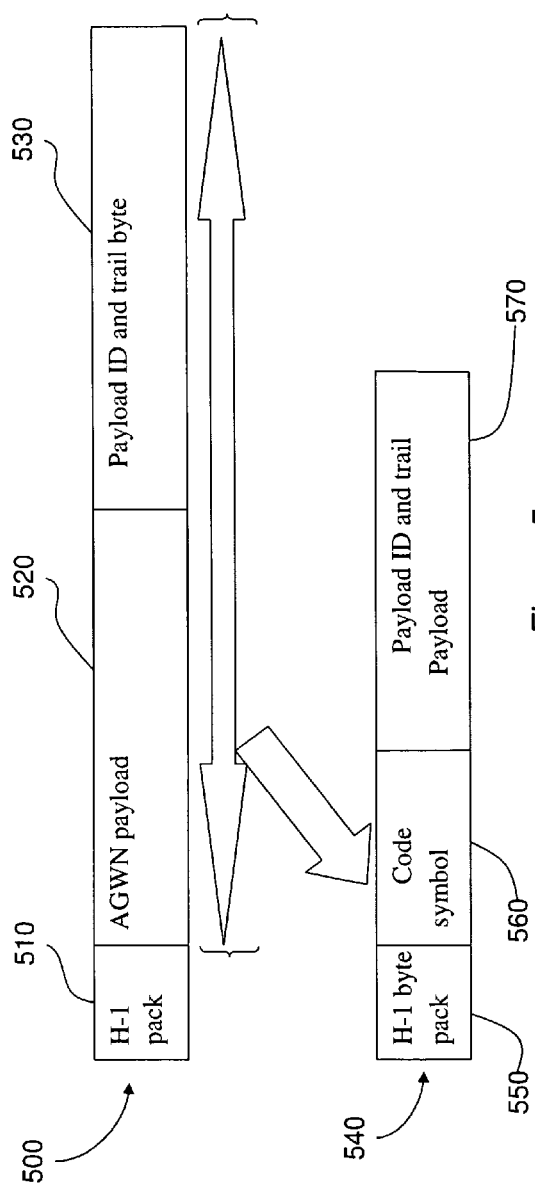

METHOD AND APPARATUS FOR AUTOMATIC POWER SAVING MODE INSERTION WHEN AN UNKNOWN OR AN OFFENSIVE RECEIVER DETECTED IN A WIRELESS ACCESS SYSTEM

CROSS-REFERENCE TO RELATED APPLICATIONS

This application is a Continuation of U.S. application Ser. No. 11/375,458 filed Mar. 14, 2006, the complete disclosure of which, in its entirety, is herein incorporated by reference.

BACKGROUND

1. Field of the Invention

The embodiments of the invention provide a method, system, etc. for automatic power saving mode insertion when an unknown or an offensive receiver detected in a wireless access system.

2. Description of the Related Art

FIG. 1 shows a typical digital quantized voice stream 100 in a communication channel. The diamond represented the bi-directional quantized active voice or useful source information, and the line represent the silent gap. More specifically, control component 110 is between voice components 120. The background nature noise is normally filtered out by the digital non-linear quantization. To add back to the realistic of feeling of channel connection and nature communication, noise packets are added to the voice codec (Coder Decoder).

In a packet switched wired or wireless communication channel 200, a typical sequence of packets from a voice codec is laying out as illustrated in FIG. 2. More specifically, the communication channel 200 comprises a sync packet 210, a voice packet channel m 220, a monitor packet 230, a BWGN packet one 240, and a voice packet channel n 250. A close examination of the bit sequence of FIG. 2 shows that there are two unutilized (no voice channel payload or system payload) time slots. First, the space in between the packet is the maximum separator time gap that can't be utilized due to separation needed in between packets. The second unutilized time slot is the AGWN (Additive Gaussian White Noise) packets. These AGWN packets have to be inserted to add to the realistic feeling of the channel link establishment. A method is created to solve this problem by closely examining the characteristic of the AGWN packets series.

The AGWN packet 300 is normally constructed, according to the format illustrated in FIG. 3. The AGWN packet is normally formatted like the sequence in FIG. 3, beyond a small header section consisted with a header ID 310, address 320 and possible checker 330 and trailer bytes 340, the vast majority of the packet is occupied by the AGWN payload 350.

A typical vocoder (Voice coder decoder) configuration may call for up to 50% of embedded AGWN packets packed together with the real voice packets in a normal voice communication channel. The overall voice packet contents are about 60% in a given channel, thus the channel utilization factor can be calculated as:

$$\text{Ratio of degradation} = \frac{U1 - U0}{U0}$$

$$1. = \frac{0.5 * 0.6 * U0 - U0}{U0}$$

$$2. = -70\%$$

As such, the situation can be summarized in FIG. 4. Specifically, FIG. 4 illustrates quantization 400, source coding 410, channel coding 420, and modem 430. This problem is that the AGWN being carry out with more and more coding along the output of source coding and send out all the way through modem, thus significantly degraded effective channel utilization. By recognize the nature of the coding sequence, a certain mathematically proven method can be further explored. The dealing with the realization of AGWN can be altered in the bit stream.

SUMMARY

Embodiments of the invention provide a method, system, etc. for automatic power saving mode insertion when an unknown or an offensive receiver detected in a wireless access system. A method comprises generating a look-up-table from AGWN payloads in a plurality of AGWN packets. The look-up-table is then transmitted from a transmitter to a receiver.

Next, the method generates a coded packet from an AGWN packet in a data packet using the look-up-table, wherein a code from the look-up-table is substituted in place of the AGWN packet. Specifically, the substituting of the code from the look-up-table comprises substituting coded symbols representing AGWN payloads in the AGWN packet. Further, the generating of the look-up-table comprises generating the code to represent size and strength information regarding an AGWN, wherein the coded packet is generated with a size that is less than the data packet.

Following this, the coded packet is transmitted from the transmitter to the receiver, wherein the coded packet is decoded back into the data packet in the receiver using the look-up-table. The decoding of the coded packet comprises obtaining the size and strength information regarding the AGWN from the code.

A system of embodiments herein comprises a look-up-table generator adapted to generate a look-up-table from a plurality of AGWN packets, wherein the look-up-table comprises AGWN payloads from the AGWN packets. A coded packet generator is also provided to generate a coded packet from an AGWN packet in a data packet using the look-up-table, wherein the coded packet comprises a size that is less than the data packet. Further, the coded packet comprises a code from the look-up-table in place of the AGWN packet, wherein the code comprises coded symbols representing AGWN payloads in the AGWN packet. The code also represents size and strength information regarding an AGWN.

The system further comprises a transmitter adapted to transmit the look-up-table and the coded packet; and a receiver adapted to receive the look-up-table and the coded packet. The receiver is further adapted to decode the coded packet back into the data packet using the look-up-table; and to obtain the size and strength information regarding the AGWN from the code.

Accordingly, embodiments herein provide methods that transmit the far small sized code of the much larger sized AGWN payload; thus, the whole down stream functional block can effectively concentrate on the voice payload and significantly improve the efficiency of the channel. The effective channel capacity will store the code table (also referred to herein as the "codebook", the "look-up-table", and/or the "LUT") in between the TX transmitter and RX receiver. After the decoding process of their represented AWGN, the RX receiver can then search the LUT the packet to get AWGN payload.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 5 is a diagram illustrating a method of re-aligning the AGWN packet generation;

FIG. 6 is a diagram illustrating a look-up-table;

DETAILED DESCRIPTION OF PREFERRED EMBODIMENTS

Figure 1:
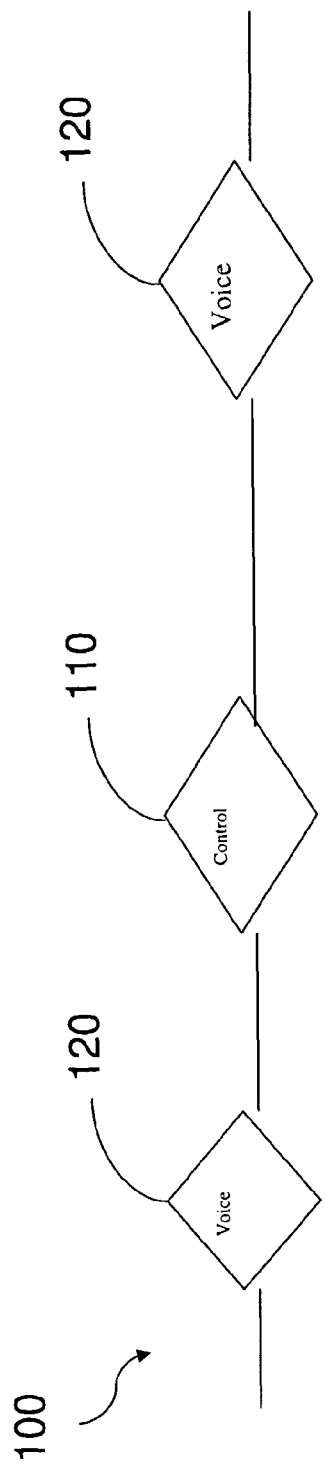
FIG. 1 is a diagram illustrating a bi-directional digitally quantized voice stream.
Figure 2:
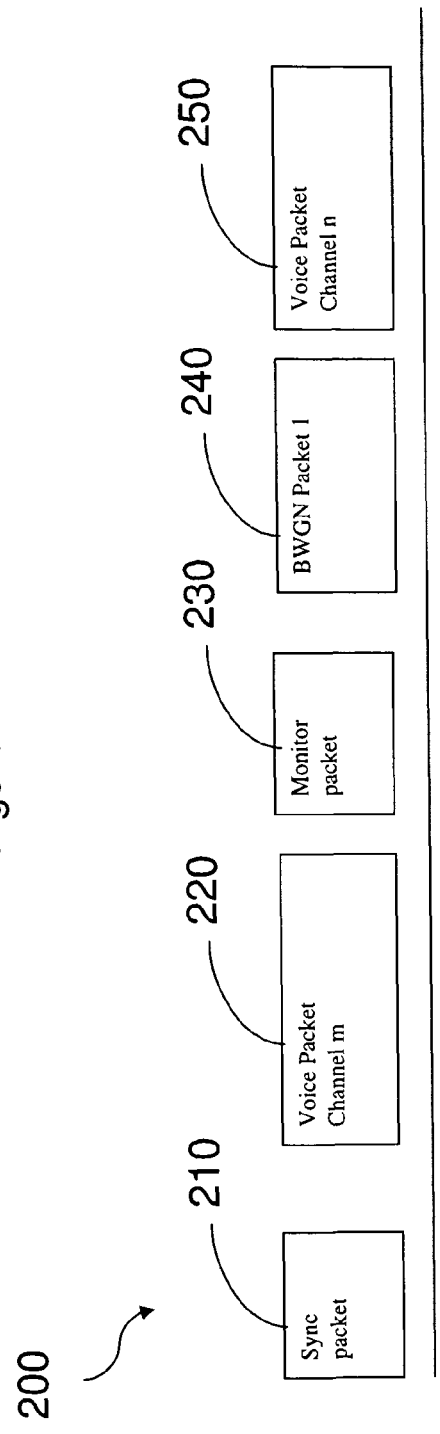
FIG. 2 is a diagram illustrating a packet sequence in a serial communication channel.
Figure 3:
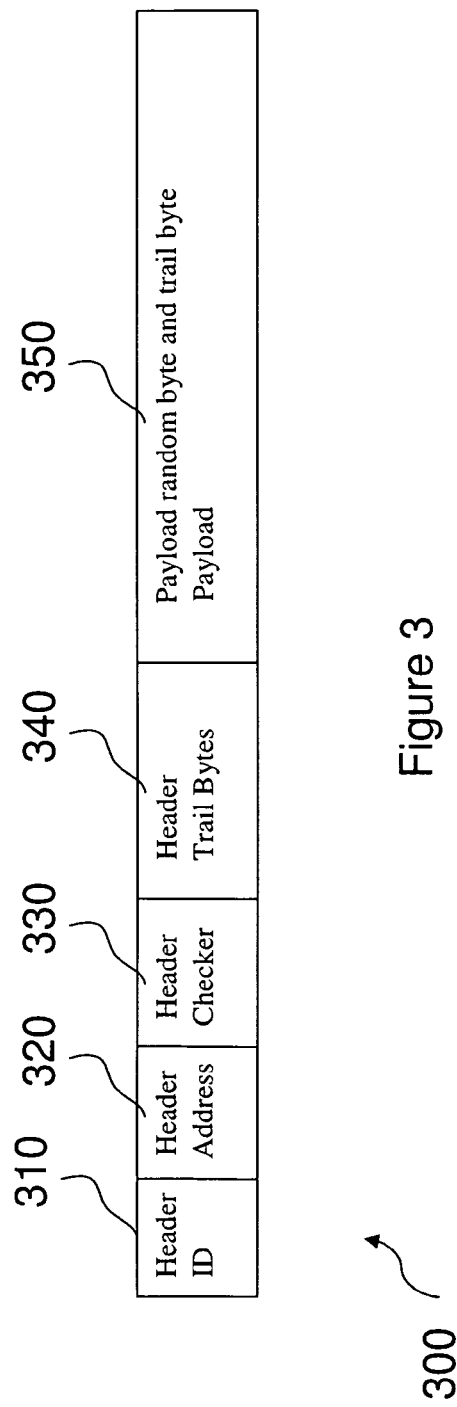
FIG. 3 is a diagram illustrating an AGWN packet structure.
Figure 4:
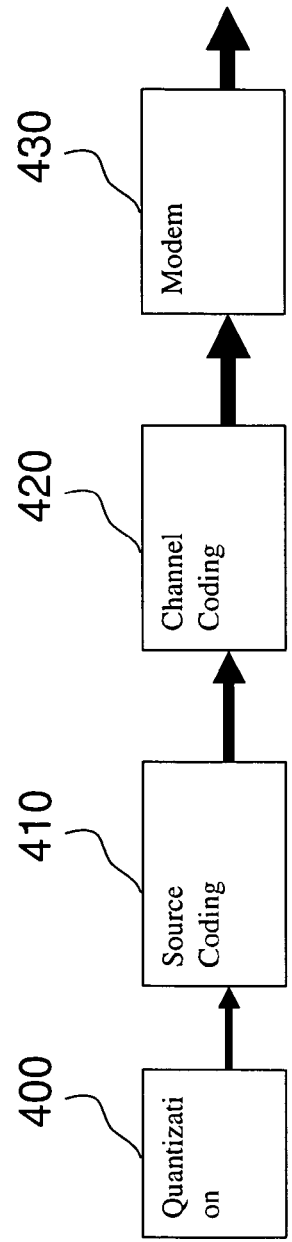
FIG. 4 is a diagram illustrating a solution stage.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Accordingly, embodiments herein provide methods that transmit the far small sized code of the much larger sized AGWN payload; thus, the whole down stream functional block can effectively concentrate on the voice payload and significantly improve the efficiency of the channel. The effective channel capacity will store the code table (also referred to herein as the "codebook", the "look-up-table", and/or the "LUT") in between the TX transmitter and RX receiver. After the decoding process of their represented AGWN, the RX receiver can then search the LUT the packet to get AWGN payload.

A method is created, based on re-distribution of the AGWN packets realization as illustrated in FIG. 5. More specifically, an original packet 500 (i.e., the AGWN packet) comprises an H-1 pack 510, an AGWN payload 520, and a payload ID and trail byte 530.

The original packet 500 is used to create a new packet 540 (i.e., the coded packet), comprising an H-1 byte pack 550, a code symbol 560, and a payload ID and trail payload 570.

An LUT codebook 600 can be created to represent the locally generated representation of AWGN, as shown in FIG. 6. The LUT symbols (i.e., the code 610) should include the AGWN part 620 (i.e., portions of the AWGN payload 520) with it size (duration) and strength information. The LUT codebook 600 can be designed as company proprietary format or in a negotiated industry standard format (for use of other database tools).

Figure 7:
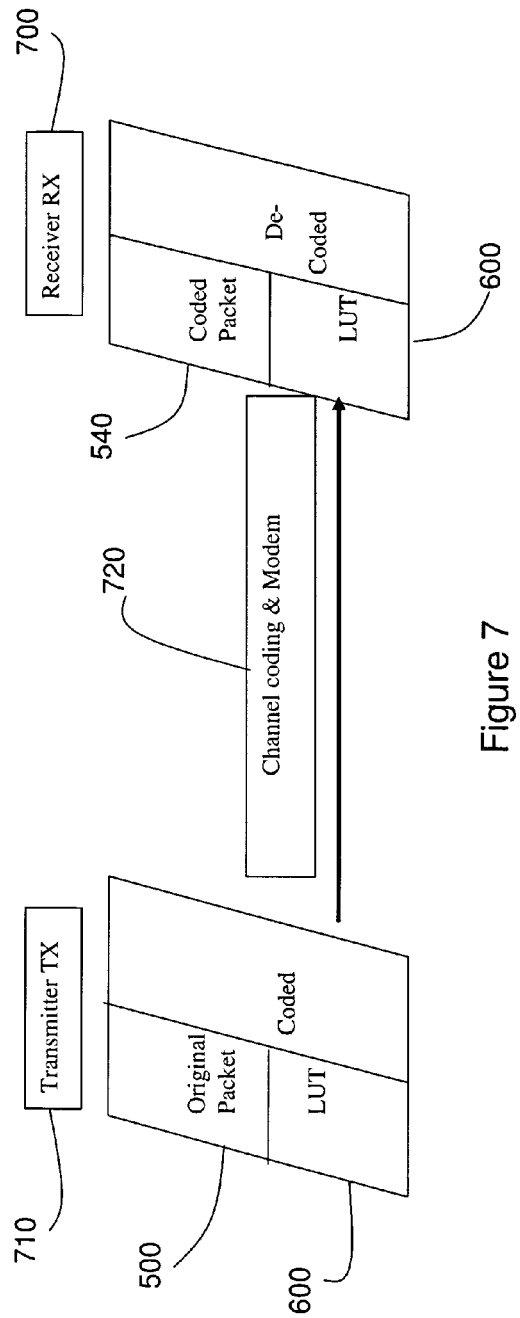
FIG. 7 is a diagram illustrating a method and process description.

The method and process is defined as follows, as illustrated in FIG. 7. First, the LUT codebook 600 is generated and transmitted to both routers by network management demon, once only during a session or even permanently stored in the receiver 700 side (also referred to herein as the "RX receiver"). Second, the TX Quantizer decided certain time gap is qualified as AWGN. Next, the TX layer of the transmitter 710 (also referred to herein as the "TX transmitter") codes AWGN size and strength according to the LUT codebook 600. The TX transmitter 710 then transmits the new coded smaller packet (i.e., the coded packet 540) through the regular channel coding and modem 720 to the RX receiver 700. The RX receiver 700 subsequently receives the coded packet 540 and then decodes it according to the LUT codebook 600, and then the original AWGN packet 500 with size and strength is recovered. Finally, the efficiency of AWGN packet reduction is achieved.

Figure 8:
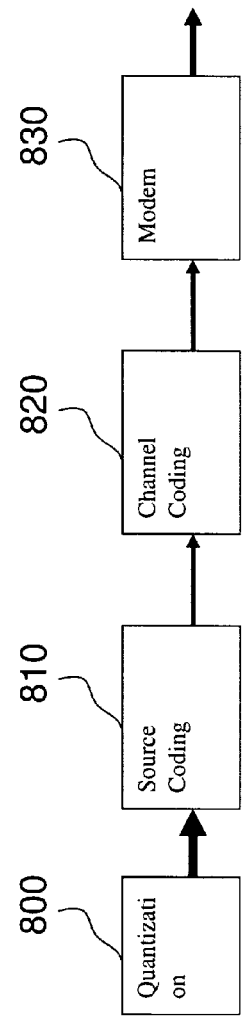
FIG. 8 is a diagram illustrating information coding efficiency.

The saving can be shown in FIG. 8 as coded packet size reduction after source coding block all the way into channel coding and modem block, thus in effect greatly increase the channel capacity. Specifically, FIG. 8 illustrates quantization 800, source coding 810, channel coding 820, and modem 830. The above method has shown that the AWGN can be generated locally in the RX receiver 700 side and thus only the entries to the LUT codebook 600 are needed to be transmitted instead of the whole AWGN payload 520.

Embodiments of the invention provide a method, system, etc. for automatic power saving mode insertion when an unknown or an offensive receiver detected in a wireless access system. A method comprises generating a look-up-table (also referred to herein as the "codebook", the "code table", and/or the "LUT") from AGWN payloads in a plurality of AGWN packets. As described above, the look-up-table can be designed as company proprietary format or in a negotiated industry standard format (for use of other database tools). The look-up-table is then transmitted from a transmitter to a receiver. Specifically, the look-up-table is transmitted to both routers by network management demon, once only during a session or even permanently stored in the RX receiver side.

Next, the method generates a coded packet from an AGWN packet in a data packet using the look-up-table, wherein a code from the look-up-table is substituted in place of the AGWN packet. More specifically, the substituting of the code from the look-up-table comprises substituting coded symbols representing AGWN payloads in the AGWN packet. Further, the generating of the look-up-table comprises generating the code to represent size and strength information regarding an AGWN, wherein the coded packet is generated with a size that is less than the data packet. As described more fully above, an original packet comprises an H-1 pack, an AGWN payload, and a payload ID and trail byte, wherein the original packet is used to create a new packet comprising an H-1 byte pack, a code symbol, and a payload ID and trail payload.

Following this, the coded packet is transmitted from the transmitter to the receiver. As described above, the TX transmitter transmits the new coded smaller packet through the regular channel coding and modem to the RX receiver. The coded packet is subsequently decoded back into the data packet in the receiver using the look-up-table. Further, the decoding of the coded packet comprises obtaining the size and strength information regarding the AGWN from the code.

Additionally, embodiments herein comprise a system having a look-up-table generator adapted to generate a look-up-table from a plurality of AGWN packets, wherein the look-up-table comprises AGWN payloads from the AGWN packets. As described above, the look-up-table can be designed as company proprietary format or in a negotiated industry standard format (for use of other database tools).

A coded packet generator is also provided to generate a coded packet from an AGWN packet in a data packet using the look-up-table, wherein the coded packet comprises a size that is less than the data packet. Further, the coded packet comprises a code from the look-up-table in place of the AGWN packet, wherein the code comprises coded symbols representing AGWN payloads in the AGWN packets. The code also represents size and strength information regarding an AGWN. As described above, the TX Quantizer decided certain time gap is qualified as AWGN. Next, the TX layer of the transmitter codes AWGN size and strength according to the look-up-table.

The system further comprises a transmitter adapted to transmit the look-up-table and the coded packet; and a receiver adapted to receive the look-up-table and the coded packet. As described above, the TX transmitter transmits the new coded smaller packet through the regular channel coding and modem to the RX receiver. The receiver is further adapted to decode the coded packet back into the data packet using the look-up-table; and to obtain the size and strength information regarding the AGWN from the code. As also described above, the RX receiver receives the coded packet and then decodes it according to the look-up-table, and then the original AWGN packet with size and strength is recovered.

Figure 9:
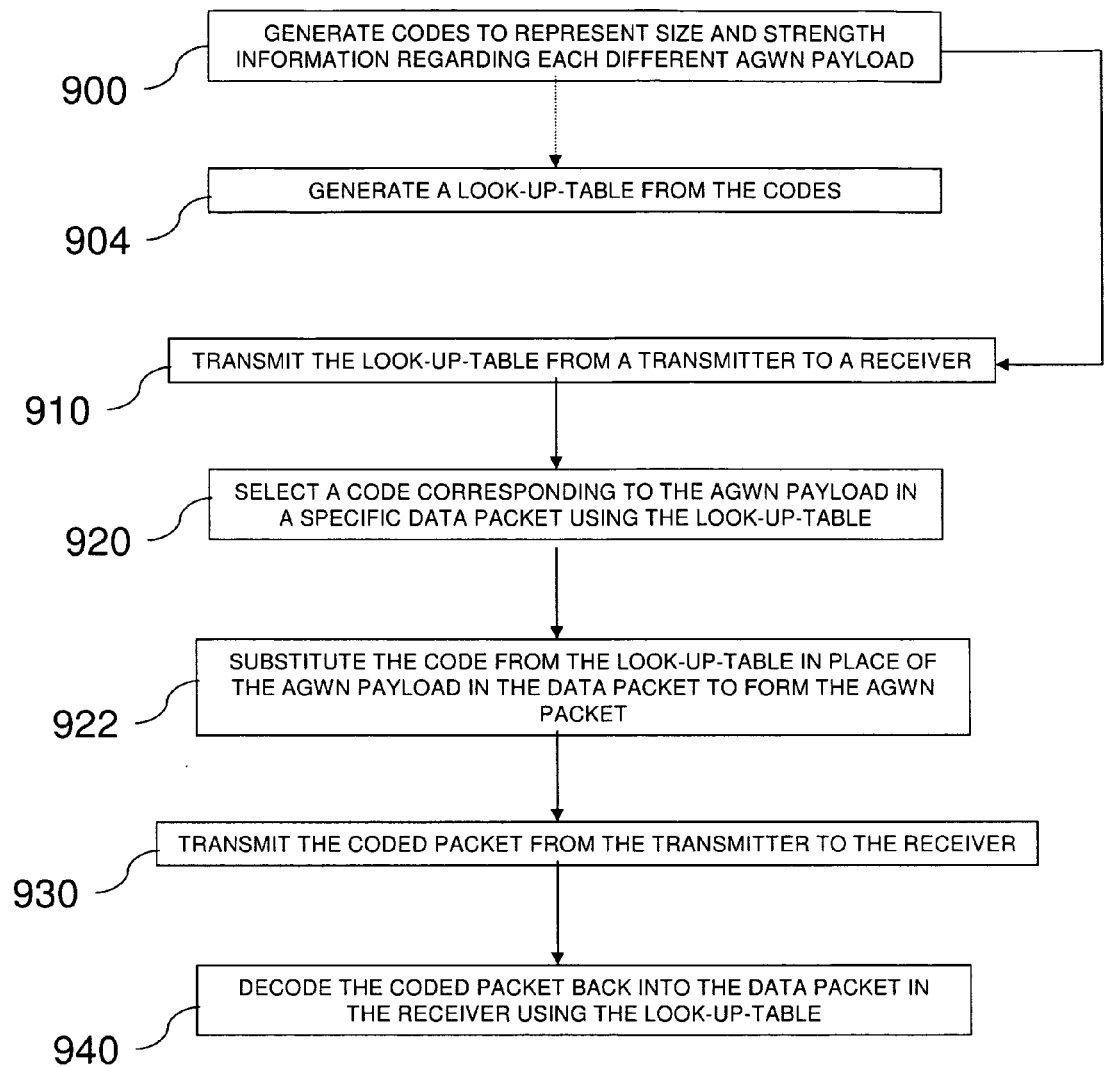
FIG. 9 is a flow diagram illustrating a method for automatic power saving mode insertion when an unknown or an offensive receiver detected in a wireless access system.

FIG. 9 illustrates a flow diagram of a method for automatic power saving mode insertion when an unknown or an offensive receiver detected in a wireless access system. The method begins, in item 900, by generating codes to represent size and strength information regarding each different AGWN payload. This involves, in item 904, generating a look-up-table from the codes generated in item 900. As described above, the look-up-table can be designed as company proprietary format or in a negotiated industry standard format (for use of other database tools). The look-up-table is then transmitted from a transmitter to a receiver in item 910.

Next, in item 920, the method substitutes the codes from the look-up-table in place of the AGWN packets, thereby substituting coded symbols representing AGWN payloads in the AGWN packets. The method, in item 922, generates a coded packet from the AGWN packet in a specific data packet using the look-up-table. Moreover, the coded packet has a size that is less than the data packet. As described more fully above, an original packet comprises an H-1 pack, an AGWN payload, and a payload ID and trail byte, wherein the original packet is used to create a new packet comprising an H-1 byte pack, a code symbol, and a payload ID and trail payload.

Following this, in item 930, the coded packet is transmitted from the transmitter to the receiver. As described above, the TX transmitter transmits the new coded smaller packet through the regular channel coding and modem to the RX receiver. The coded packet is subsequently decoded back into the data packet in the receiver using the look-up-table (item 940), wherein the size and strength information regarding the AGWN is obtained from the code.

Accordingly, embodiments herein provide methods that transmit the far small sized code of the much larger sized AGWN payload; thus, the whole down stream functional block can effectively concentrate on the voice payload and significantly improve the efficiency of the channel. The effective channel capacity will store the code table in between the TX transmitter and RX receiver. After the decoding process of their represented AWGN, the RX receiver can then search the LUT the packet to get AWGN payload.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method, comprising:
    generating a look-up-table from a plurality of additive Gaussian white noise packets, said look-up-table including symbol codes associated with each of said additive Gaussian white noise packets;
    transmitting said look-up-table from a transmitter to a receiver;
    generating a coded packet from an additive Gaussian white noise packet in a data packet using said look-up-table;
    transmitting said coded packet from said transmitter to said receiver; and
    decoding said coded packet back into said data packet in said receiver using said look-up-table to match a symbol code of said coded packet with an associated additive Gaussian white noise packet.

2. The method according to claim 1, wherein said generating of said coded packet comprises generating said coded packet with a size that is less than said data packet.

3. The method according to claim 1, wherein said generating of said coded packet comprises substituting a code from said look-up-table in place of said additive Gaussian white noise packet.

4. The method according to claim 3, wherein said generating of said look-up-table comprises generating said code to represent size and strength information regarding an additive Gaussian white noise.

5. The method according to claim 4, wherein said decoding of said coded packet comprises obtaining said size and strength information regarding said additive Gaussian white noise from said code.

6. The method according to claim 3, wherein said substituting of said code from said look-up-table comprises substituting coded symbols representing additive Gaussian white noise payloads in said additive Gaussian white noise packet.

7. The method according to claim 1, wherein said generating of said look-up-table comprises generating said look-up-table from additive Gaussian white noise payloads in said additive Gaussian white noise packets.

8. A method, comprising:
    generating a look-up-table from a plurality of additive Gaussian white noise packets, said look-up-table including symbol codes associated with each of said additive Gaussian white noise packets;
    transmitting said look-up-table from a transmitter to a receiver;

generating a coded packet from an additive Gaussian white noise packet in a data packet using said look-up-table, wherein said generating of said coded packet comprises substituting a code from said look-up-table in place of said additive Gaussian white noise packet;

transmitting said coded packet from said transmitter to said receiver; and decoding said coded packet back into said data packet in said receiver using said look-up-table to match a symbol code of said coded packet with an associated additive Gaussian white noise packet.

9. The method according to claim 8, wherein said generating of said coded packet comprises generating said coded packet with a size that is less than said data packet.

10. The method according to claim 8, wherein said generating of said look-up-table comprises generating said code to represent size and strength information regarding an additive Gaussian white noise.

11. The method according to claim 10, wherein said decoding of said coded packet comprises obtaining said size and strength information regarding said additive Gaussian white noise from said code.

12. The method according to claim 8, wherein said generating of said look-up-table comprises generating said look-up-table from additive Gaussian white noise payloads in said additive Gaussian white noise packets.

13. The method according to claim 8, wherein said substituting of said code from said look-up-table comprises substituting coded symbols representing additive Gaussian white noise payloads in said additive Gaussian white noise packet.

14. A system, comprising:

a look-up-table generator adapted to generate a look-up-table from a plurality of additive Gaussian white noise packets, said look-up-table including symbol codes associated with each of said additive Gaussian white noise packets;

a coded packet generator adapted to generate a coded packet from an additive Gaussian white noise packet in a data packet using said look-up-table;

a transmitter adapted to transmit said look-up-table and said coded packet; and a receiver adapted to receive said look-up-table, receive said coded packet, and decode said coded packet back into said data packet using said look-up-table to match a symbol code of said coded packet with an associated additive Gaussian white noise packet.

15. The system according to claim 14, wherein said coded packet comprises a size that is less than said data packet.

16. The system according to claim 14, wherein said coded packet comprises a code from said look-up-table in place of said additive Gaussian white noise packet.

17. The system according to claim 16, wherein said code represents size and strength information regarding an additive Gaussian white noise.

18. The system according to claim 17, wherein said receiver is adapted to obtain said size and strength information regarding said additive Gaussian white noise from said code.

19. The system according to claim 16, wherein said code comprises coded symbols representing additive Gaussian white noise payloads in said additive Gaussian white noise packet.

20. The system according to claim 14, wherein said look-up-table comprises additive Gaussian white noise payloads from said additive Gaussian white noise packets.

* * * * *